United States Patent [19]

Nagashima

[11] Patent Number: 4,905,214
[45] Date of Patent: Feb. 27, 1990

[54] METHOD FOR ILLUMINATING ADJOINING SLANTS OF AN OPTICAL DISK HAVING A V-SHAPED GROOVE

[75] Inventor: Michiyoshi Nagashima, Hirakata, Japan

[73] Assignee: Matsushita Electric Industrial Co., Ltd., Tokyo, Japan

[21] Appl. No.: 298,025

[22] Filed: Jan. 18, 1989

Related U.S. Application Data

[60] Division of Ser. No. 170,130, Mar. 14, 1988, Pat. No. 4,868,820, which is a continuation of Ser. No. 525,411, Aug. 22, 1983, abandoned.

[30] Foreign Application Priority Data

Aug. 24, 1982 [JP] Japan .................. 57-147133

[51] Int. Cl.$^4$ .................. G11B 7/09; G11B 7/007
[52] U.S. Cl. .................. 369/44; 369/45; 369/46; 369/106; 369/112; 358/342
[58] Field of Search .................. 358/342; 369/32, 44, 369/45, 46, 47, 48, 100, 101, 102, 106, 107, 109, 110, 111, 112, 117, 118, 120, 121, 124

[56] References Cited

U.S. PATENT DOCUMENTS

| | | | |
|---|---|---|---|
| 4,001,493 | 1/1977 | Cone | 369/101 X |
| 4,161,752 | 7/1979 | Basilico | 369/109 X |
| 4,216,357 | 8/1980 | Iwasaki et al. | 369/45 X |
| 4,283,777 | 8/1981 | Curry et al. | 369/47 X |
| 4,298,974 | 11/1981 | Tsunoda et al. | 369/45 |
| 4,301,527 | 11/1981 | Tsunoda et al. | 369/45 |
| 4,310,916 | 1/1982 | Dil | 369/47 X |
| 4,325,135 | 4/1982 | Dil et al. | 369/109 X |
| 4,349,901 | 12/1982 | Howe | 369/45 |
| 4,365,323 | 12/1982 | Heemskerk et al. | 369/44 |
| 4,390,781 | 6/1983 | Musha | 369/45 X |
| 4,403,318 | 9/1983 | Nagashima et al. | 369/100 |
| 4,451,863 | 5/1984 | Yanagida et al. | 369/46 X |
| 4,517,667 | 5/1985 | Sprague | 369/109 X |
| 4,520,471 | 5/1985 | Carlin | 369/122 X |
| 4,520,472 | 5/1985 | Reno | 369/112 |
| 4,534,021 | 8/1985 | Smith | 369/47 |
| 4,546,463 | 10/1985 | Opheij et al. | 369/45 X |
| 4,556,967 | 12/1985 | Braat | 369/48 X |
| 4,564,931 | 1/1986 | O'Hara et al. | 369/111 X |
| 4,566,088 | 1/1986 | Yoshida et al. | 369/44 |
| 4,569,038 | 2/1986 | Nagashima et al. | 369/44 |

FOREIGN PATENT DOCUMENTS 2079031 1/1982 United Kingdom .

*Primary Examiner*—Aristotelis M. Psitos
*Assistant Examiner*—W. R. Young
*Attorney, Agent, or Firm*—Spencer & Frank

[57] ABSTRACT

An optical disk and a method of recording, reproducing or erasing information on the disk by using laser beams. The optical disk is provided thereon with grooves each having a V-shaped groove in the radial directioin. At least two laser beams are focused on two adjoining slants of each V-shaped groove so that these two slants are used concurrently for high-density recording reproducing or erasing of high-quality information.

2 Claims, 8 Drawing Sheets

LASER

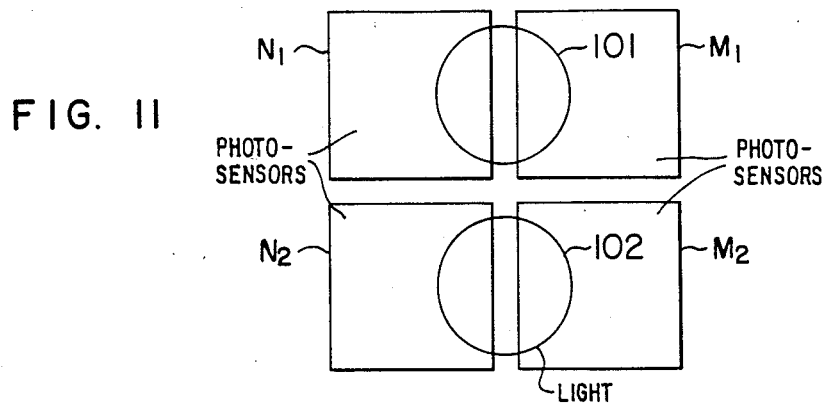

METHOD FOR ILLUMINATING ADJOINING SLANTS OF AN OPTICAL DISK HAVING A V-SHAPED GROOVE

This is a division of an application, Ser. No. 07/170,130, filed Mar. 14th, 1988, now U.S. Pat. No. 4,868,820, issued Sept. 19th, 1989. Application Ser. No. 07/170,130 was a continuation of an earlier application, Ser. No. 06/525,411, filed Aug. 22nd, 1983, now abandoned.

BACKGROUND AND SUMMARY OF THE INVENTION

The present invention relates to an optical disk capable of high-density recording, reproducing or erasing of high-quality information, and to a method of high-density recording, reproducing or erasing of high-quality information on the optical disk.

There are commercially available "Optical Video Disks" in which video signals are reproduced by way of focusing a laser beam on the optical disk. An optical disk of 30 cm in diameter with a record of frequency modulated television signals at a track pitch of 1.67 $\mu$m has a duration of 30 minutes at a turning speed of 1800 RPM for reproduction of the recorded signals on each side. A method has been developed for recording, reproducing or erasing signals in the same way as for video tape by the provision of a thin film of recording material (e.g., tellurium sub-oxide film) on the surface of the optical disk, and it is expected that this will enable expansion to a "Recording/Reproduction Video Disk". Moreover, due to its non-contact operation, which brings semi-permanent service life and high-speed access faster than a VTR (VCR), extensive applications in computer peripheral devices such as "Data Files" are expected.

In the present state of the art, video disks can reproduce higher quality pictures than household VTRs. A new method is being researched which records a video signal on a video tape through a process of digitization and band compression, and digitization of household VTRs recording will be seen in the not too distant future. On this account, it is desired to develop a method of recording, reproducing or erasing high-quality information such as digital video signals on a real-time basis on an optical disk.

It is therefore an object of the present invention to provide a method of recording, reproducing or erasing high-quality information on a real-time basis on an optical disk which is provided with grooves each having a V-shaped cross section in the radial direction of the disk so as to form a pair of information tracks on adjoining slants where discrete pieces of high-quality information are recorded divisionally and reproduced respectively on a real-time basis.

BRIEF DESCRIPTION OF THE DRAWINGS

FIG. 11 is a diagram showing the arrangement of reproducing photo-sensors of the second and third embodiments;

FIGS. 12a, 12b and 12c are diagrams explaining the third embodiment of the present optical system;

DESCRIPTION OF THE PREFERRED EMBODIMENTS

Figure 1:
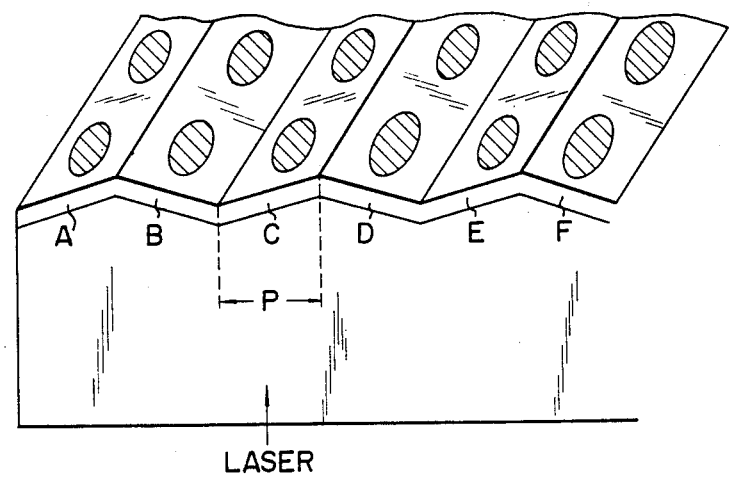
FIG. 1 is a sectional perspective view showing an structure of the optical disk provided with V-shaped grooves.
Figure 2:
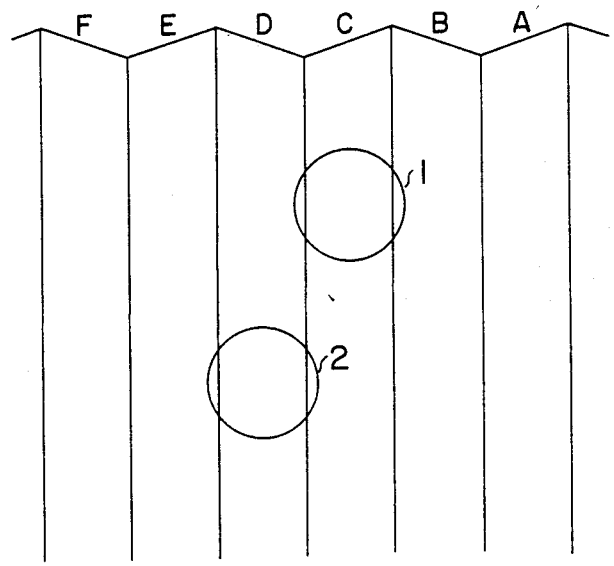
FIG. 2 is a diagram showing laser spots on the optical disk.

On the surface of an optical disk, V-shaped grooves as shown in FIG. 1 are formed so that all slants of the grooves are used as signal recording tracks. The grooves are made at an interval, for example, equal to the track pitch of the currently available video disk. Using at least two laser sources, laser spots 1 and 2 are projected on the central portions of two adjoining slants such as A and B, or C and D in FIG. 1, as shown in FIG. 2. The laser beams are activated individually so that separate signals are recorded on two adjoining slants concurrently. When signals on one slant of the V-shaped groove are reproduced by the method disclosed in U.S. Pat. No. 4,569,038, crosstalk from the adjacent slants can be made sufficiently small. Since laser beams produced by separate sources do not interfere with each other, signals on two adjoining slants of a V-shaped groove can be reproduced independently using two laser beams. Using two adjoining slants in a pair for recording discrete pieces of information divisionally allows recording and reproduction of high-quality information such as digital video information.

If a color television signal using the NTSC system is digitized into 8-bit data by the composite system at a sampling frequency of 10.74 MHz, the necessary data rate is 86M bits/sec. Excluding the flyback period, adding error correction, and using correlation between adjoining picture elements within a field, the band can be reduced to 40-50% by a predictive encoding method. Accordingly, the NTSC color television signal can be expressed by 35M–43M bits/sec. In the present state of the art, analog signals of about 10 MHz can be recorded on and reproduced from a circular track with a radius of 55 mm from the center of the disk, which rotates at 1800 RPM. This means that digital signals of about 20M bits/sec can be recorded and reproduced using an MFM modulation system. However, this does not suffice to handle digital video signals. On the other hand, if the two slants of each V-shaped groove are used as a pair as mentioned previously, digital signals of about 40M bits/sec can be recorded and reproduced, and thus the digitized NTSC color television signal can be recorded and reproduced in real time.

In addition, since the interval of the V-shaped grooves is set equal to the track pitch of the commercialized video disk, the same playback time length can be ensured for the digital video disk. A disk of 30 cm in diameter can record and reproduce digital video information on both sides for 1 hour in constant angular velocity (CAV) operation or 2 hours in constant linear velocity (CLV) operation.

Figure 3:
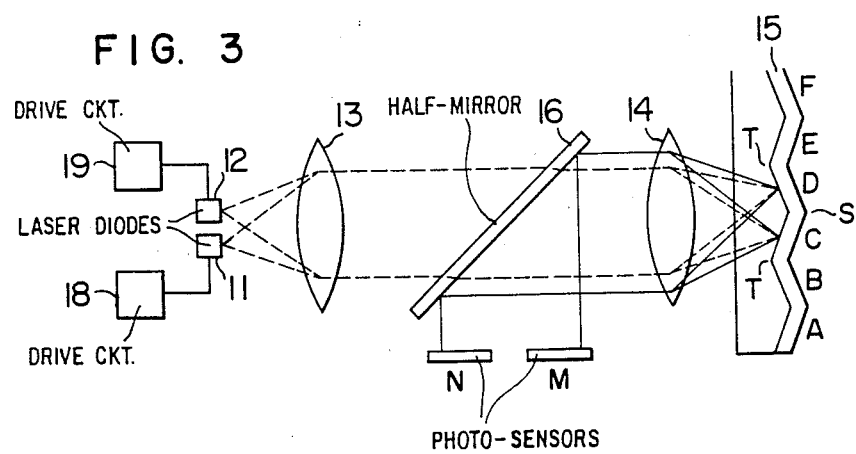
FIG. 3 is a diagram explaining a basic optical system according to the present invention.
Figure 4:
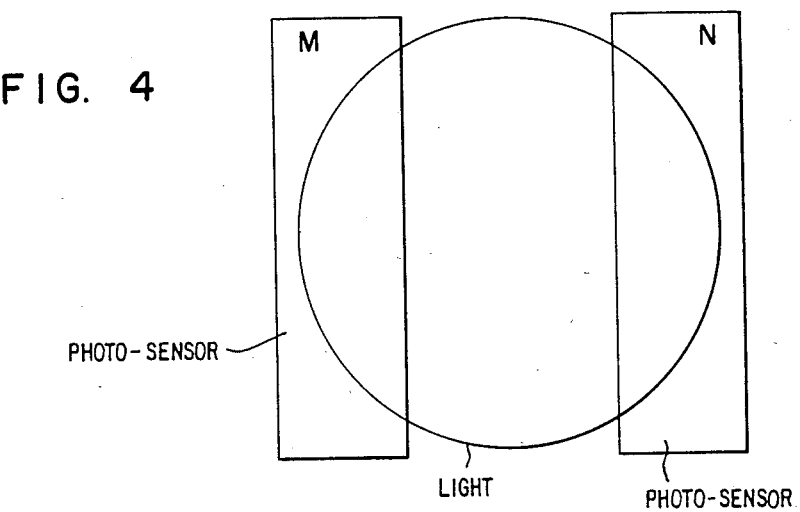
FIG. 4 is a diagram showing the arrangement of the reproducing photo-sensors.

The basic conception of the optical system for realizing the inventive method will now be described with reference to FIGS. 3 and 4. Laser emissions made by laser diodes 11 and 12 are collimated by an objective lens 13. The two laser beams enter separately to an object lens 14 substantially in parallel to its optical axis, and are focused on an optical disk 15. Laser beams reflected from the disk are conducted again through the objective lens 14 and then guided apart from the incident path by a half-mirror 16. In the figure, the incident beams are defined by the dashed lines and the reflection beams are defined by the solid lines. The reflection beams are received by two photo-sensors M and N so that signals carried by them are reproduced.

A laser beam created by one laser diode is coherent and interferes in both the time domain and space domain. That is, the beam has temporal coherence and spatial coherence. On the other hand, laser beams created by separate laser diodes do not interfere with each other. The laser beam produced by the laser diode 11 is projected to the center of a slant C, while the laser beam produced by the laser diode 12 is projected to the center of a slant D, and these laser spots do not interfere with each other. Accordingly, the laser diodes 11 and 12 can record separate signals on the slants C and D concurrently by being activated by respective drive circuits 18 and 19 independently. Reflection laser beams from the disk 15 originating from the laser diodes 11 and 12 do not interfere with each other, and include signals of the slants C and D independently. FIG. 4 shows the arrangement of the photo-sensors M and N, and the outer bound of the reflection beams on their photo-sensing surface. As disclosed in U.S. Pat. No. 4,569,038, the photo-sensors M and N can independently reproduce signals on the slants C and D, respectively. Namely, by use of the two laser diodes 11 and 12, separate signals can be recorded on the slants C and D concurrently, and these signals can separately be reproduced concurrently.

TRACKING METHOD

Figure 5:
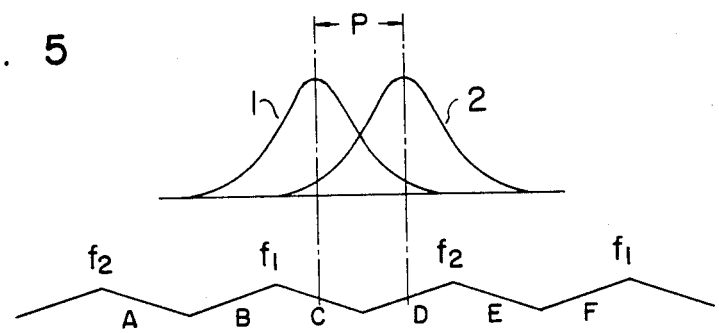
FIG. 5 is a diagram explaining the method of tracking control.
Figure 6:
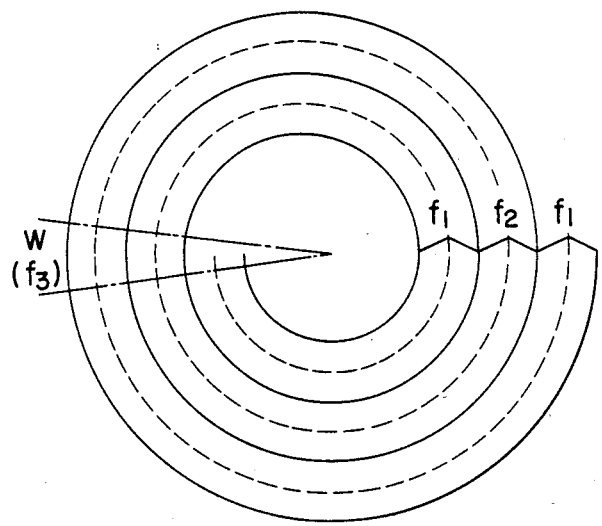
FIG. 6 is a diagram showing a spiral V-shaped groove on the optical disk.

V-shaped grooves are formed such that the depth of the grooves is made to change with a very small cyclic variation (e.g., 0.02 μm) by changing their peaks alternately at two frequencies for every two adjoining grooves. As shown in FIG. 5, alternate peak portions are provided at frequencies of $f_1$ and $f_2$ to define varying depths of the grooves. Laser spots 1 and 2 with a center distance of P are placed on the slants C and D, respectively. The intensities of the laser beams reflected from the disk are modulated by the two frequencies $f_1$ and $f_2$, which are far lower than the frequencies of the signals recorded on the slants. If a laser spot deviates rightward (toward slant E in FIG. 5), the reflection beam includes an increasing component modulated by the frequency $f_2$ and decreasing component modulated by the frequency $f_1$. Conversely, if a laser spot deviates leftward (toward slant B in FIG. 5), the component of $f_1$ increases and the component of $f_2$ decreases. Accordingly, by controlling the optical system so that the reflection beams include equal amounts of components varying at two frequencies $f_1$ and $f_2$, the two laser spots can be kept on the tracks on the slants C and D. In tracking the laser spots on slants A and B, a deviation of the spots to the right in FIG. 5 results in an increase of the $f_1$ component as opposed to the tracking on the slants C and D. That is, control of the tracking on the slants A and B has an opposite polarity relationship with respect to the control of the tracking on the slants C and D. FIG. 6 shows a V-shaped groove formed in a spiral, and the groove has a depth varying at frequencies of $f_1$ and $f_2$ alternately in every revolution. The solid line indicates the bottom of the groove which is traced by the middle point of two laser spots. It will be seen from the above description that the spiral groove can be traced continuously by switching the polarity of tracking control at every revolution of the optical disk. The switching of polarity takes place when the variation of depth of the groove changes from frequency $f_1$ to $f_2$ and from $f_2$ to $f_1$. To find the point of change of the frequency, the groove has its depth varying at a third frequency $f_3$ for a short interval, i.e., section W in FIG. 6. Consequently, when the laser spot illuminates the section W on the turning disk and detects the frequency $f_3$, the polarity of tracking control is switched.

The basic optical system for realizing the present invention has been described in connection with FIG. 3. Embodiments including the method of controlling the optical system will now be described.

EMBODIMENT 1

Figure 7A:
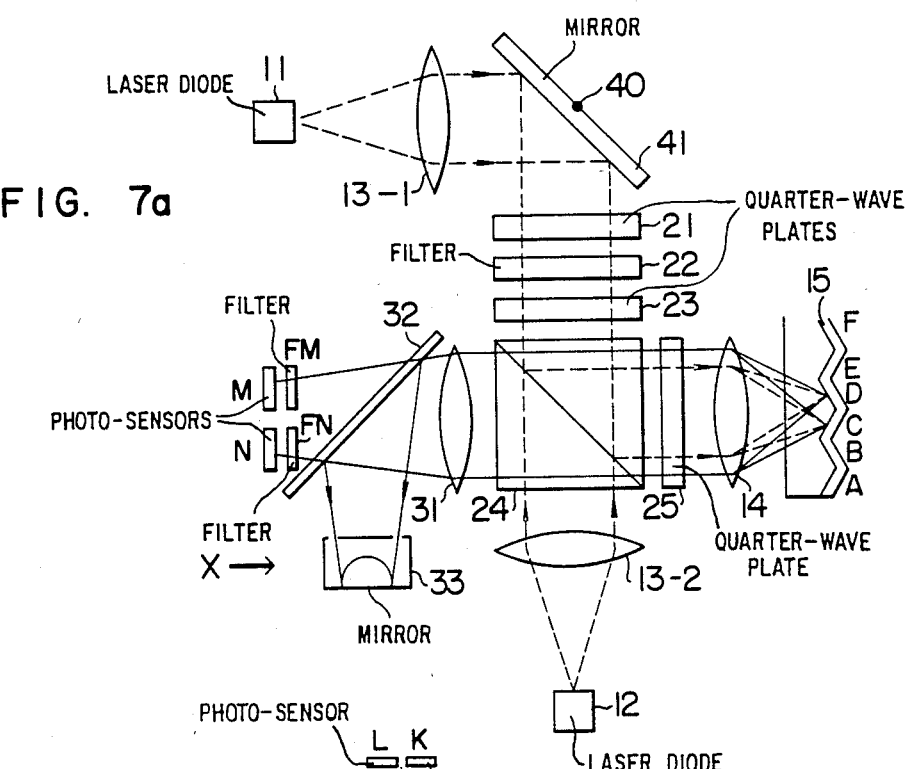
FIGS. 7a and 7b are diagrams explaining the first embodiment of the optical system according to the present invention.
Figure 7B:
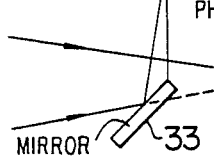

FIG. 7a shows an optical system including two laser diodes 11 and 12 providing beams of separate wavelengths $\lambda_1$ and $\lambda_2$, respectively. The wavelengths are, for example, $\lambda_1 = 780$ nm and $\lambda_2 = 840$ nm. The laser beam created by the laser diode 11 is collimated by an objective lens 13-1, reflected by a mirror 41, conducted through a quarter-wave plate 21, optical filter 22 and quarter-wave plate 23, and then reflected by a polarization beam splitter 24. Thereafter, the laser beam is conducted through a quarter-wave plate 25, focused by an objective lens 14, and then projected to the center of the slant C. The optical filter 22 transmits the beam of wavelength $\lambda_1$, and reflects the beam of wavelength $\lambda_2$. The optical elements are arranged such that the polarizing angle of the laser beam is rotated by 90 degrees by the two quarter-wave plates 21 and 23, and the beam is reflected as an S-wave (S-polarized light) by the polarization beam splitter 24. The laser beam created by the laser diode 12 is condensed by an objective lens 13-2, transmitted as a P-wave (P-polarized light) by the polarization beam splitter 24, conducted through the quarter-wave plate 23, reflected by the optical filter 22, conducted back through the quarter-wave plate 23, and then reflected as an S-wave by the polarization beam splitter 24. Thereafter, the laser beam is conducted through the quarter-wave plate 25, focused by the objective lens 14, then projected to the center of the slant D. The laser beams of wavelengths $\lambda_1$ and $\lambda_2$ reflected from the optical disk 15 are conducted through the objective lens 14 and quarter-wave plate 25, transmitted as P-waves by the polarization beam splitter 24, and then concentrated by a convex lens 31. A half-mirror 32 separates each of the beams of wavelengths $\lambda_1$ and $\lambda_2$ into a reflection beam and a transmission beam. FIG. 7b is a view of a mirror 33 seen in the direction of X in FIG. 7a. The mirror 33 reflects one of the wavelengths $\lambda_1$ or $\lambda_2$, and transmits the other. The reflection beams from the half-mirror 32 are selectively reflected and concentrated (e.g., only the laser beam with wavelength $\lambda_1$) by the mirror 33 on to a focal plane where photosensors K and L are located, so that focusing of the laser spots on the optical disk is controlled by way of the conventional knife-edge system. Since both laser beams of wavelengths $\lambda_1$ and $\lambda_2$ converge on the focal plane of the objective lens 14, they can equally be focused on the optical disk merely by the focal control for one laser beam. Transmission beams through the half-mirror 32 are projected on to photo-sensors M and N as shown in FIG. 4, and used for the reproduction of information. In addition, signals with frequencies $f_1$ and $f_2$ are extracted on the photo-sensors M and N, and tracking control as described in connection with FIG. 5 is performed.

As can be seen from the description in U.S. Pat. No. 4,569,038, the photo-sensor M mainly receives the laser beam of wavelength $\lambda_1$ including information on slant C. The sensor also receives a small amount of light with wavelength $\lambda_2$, causing a crosstalk of signals. This crosstalk is too small in degree to raise a problem in reproducing digital signals. To increase the separation of the information reproduced from slants C and D, an arrangement may be made such that the photo-sensor M is covered by a filter FM, which transmits the beam of wavelength $\lambda_1$ and reflects the beam of wavelength $\lambda_2$, and the photo-sensor N is covered by a filter FN, which transmits the beam of wavelength $\lambda_2$ and reflects the beam of wavelength $\lambda_1$.

The laser spots 1 and 2 must be projected to the center of an adjoining pair of slants as shown in FIG. 2. In order for the middle point of two laser spots to trace the bottom of a V-shaped groove, tracking control as described in connection with FIG. 5 is used. However, a fine adjustment is needed to make the distance of two laser spots in the disk radial direction equal to half the groove pitch (P in FIGS. 1 and 5). This adjustment is carried out by finely turning the mirror 41 (e.g., 0.1 miliradian) around its center 40.

A feature of this embodiment is that laser beams from the two laser diodes are directed together in a substantially parallel relationship with each other by the arrangement of FIG. 7, which includes quarter-wave plates 21 and 23, optical filter 22 and polarization beam splitter 24. The laser beams entering the objective lens 14 are substantially parallel to the optical axis thereof, thereby preventing laser beams reflected on the optical-disk from returning to their sources, and yet both wavelength laser beams reflected on the optical disk 15 are used for signal reproduction and tracking control. In order to focus a laser beam on the optical-disk with little aberration, the laser beam must have an angle within 2–3 degrees with respect to the optical axis of the objective lens. The above-mentioned "parallel" entry to the objective lens implies an angle within 2–3 degrees.

EMBODIMENT 2

In order to record, reproduce or erase information on a medium, it is known to use a thin film of tellurium sub-oxide mixed with an additive (refer to U.S. Pat. No. 4,403,318. The thin film can have a high refractivity (e.g., in a crystalline state) by being cooled slowly after it has been heated to a high temperature, or conversely, can have a low refractivity (e.g., in a noncrystalline or amorphous state) by being cooled quickly after it has been heated to a high temperature. Thus, in order to permit both recording and erasing, the material is put in the high refractivity state in advance by a heat treatment or the like, and information can be recorded by the heat-and-quick-cool process using a small laser spot, and information can be erased by the heat-and-slow-cool process using an elliptical laser spot or by irradiation of two or more laser spots consecutively.

Figure 8A:
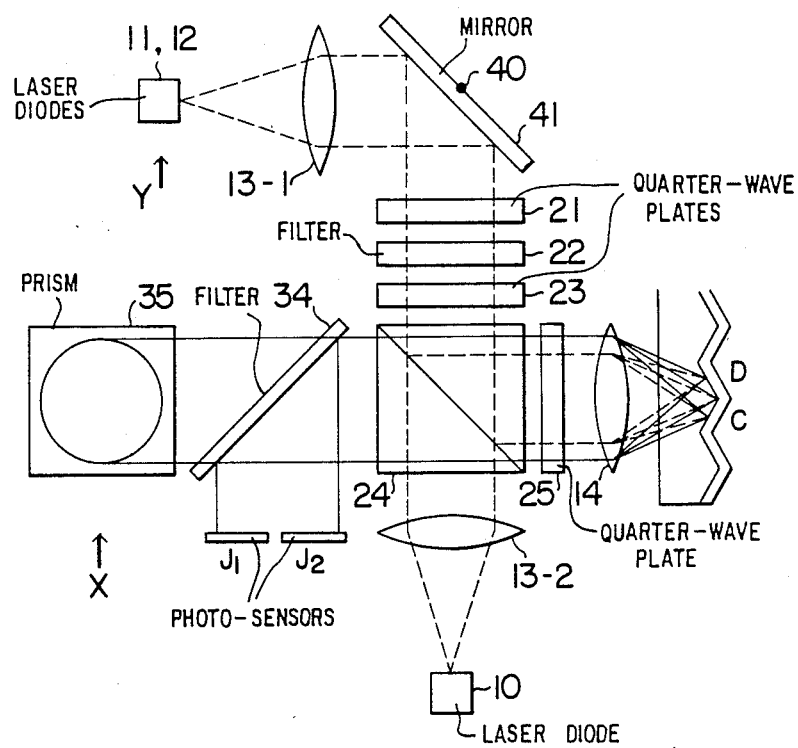
FIGS. 8a, 8b and 8c are diagrams explaining the second embodiment of the present optical system.
Figure 8B:
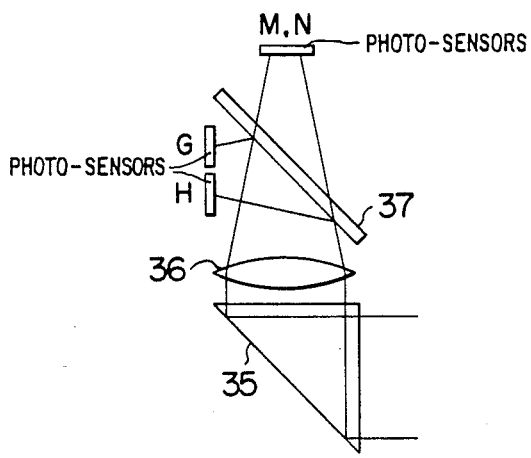
Figure 8C:
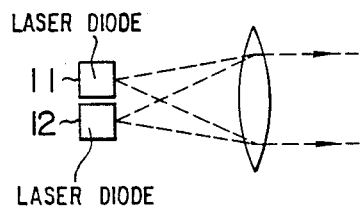
Figure 9A:
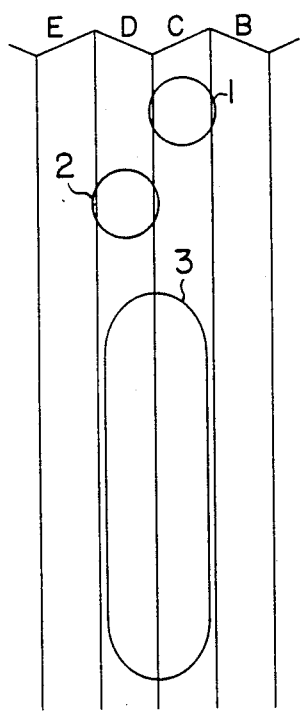
FIGS. 9a and 9b are diagrams showing laser spots on the optical disk of the second embodiment.
Figure 9B:
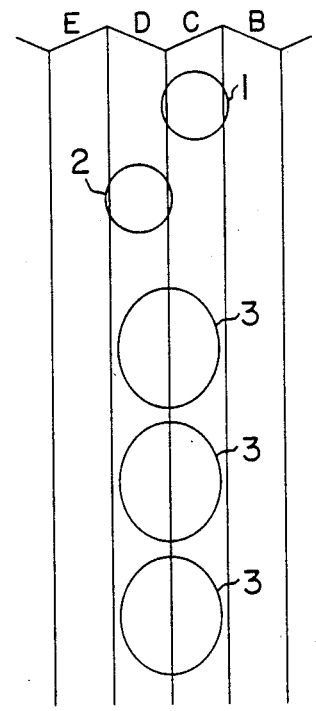
Figure 10:
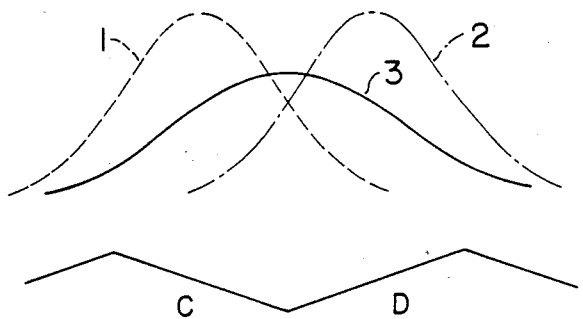
FIG. 10 is a graph showing the laser intensity distribution on the optical disk of the second embodiment.

The second embodiment allows the erasure of signals based on the above-mentioned principle, and its optical system is shown in FIGS. 8a, 8b and 8c. The system uses two laser diodes 11 and 12 providing beams of wavelength $\lambda_1$ integrated in one chip, and a laser diode 10 providing a beam of wavelength $\lambda_2$. The wavelengths are equal to those in the first embodiment: $\lambda_1 = 780$ nm and $\lambda_2 = 840$ nm. The laser diodes 11 and 12 produce circular spots 1 and 2 on two adjoining slants of a V-shaped groove as shown in FIGS. 9a and 9b. The laser diode 10 has an elliptical emission section or a number of aligning emission sections so as to produce a spot 3 (as shown in FIG. 9a) or spots 3 (as shown in FIG. 9b) along the bottom of the groove. The spot 3 has a larger dimension in the longitudinal direction of the groove and has a lateral dimension larger than that of the spots 1 and 2 so that it can erase signals on two adjoining slants concurrently. FIG. 10 shows the intensity distribution of each laser spot on the disk. These spots are focused on the disk in the same way as in the first embodiment. An optical filter 34, which also acts as a half mirror, transmits the beams of wavelength $\lambda_1$ and reflects the beam of wavelength $\lambda_2$. The laser beams reflected from the optical disk are transmitted through a polarization beam splitter 24, but the wavelength $\lambda_2$ of the erasing laser beam is reflected by the optical filter 34, and only laser beams with the wavelength $\lambda_1$ transmitted through the optical filter 34 are used for tracking control and signal reproduction. FIGS. 8b and 8c are views of the optical system seen in the directions of X and Y in FIG. 8a, respectively. The laser beams transmitted through the filter 34 are reflected by a prism 35 at its critical angle, condensed by a convex lens 36, and then divided by a half-mirror 37. The laser beams transmitted through the half-mirror 37 are received by photo-sensors M and N so that signals are reproduced. In the first embodiment, the photo-sensors M and N are placed at positions where both laser beams from the laser diodes 11 and 12 are of sufficiently far-field and are not separated from each other, whereas in the second embodiment, the photo-sensors are placed at positions where the beams from the laser diodes 11 and 12 are not focused and are of yet far-field, but are separated from each other. For example, with the laser spots 1 and 2 being spaced apart by a distance of 30 μm in the groove longitudinal direction, with the objective lens 14 having a focal length of 3.6 mm and an aperture of 4.3 mm, and with the convex lens 36 having a focal length of 40 mm, the photo-sensors may be placed approximately 38 mm apart from the convex lens 36. FIG. 11 shows the arrangement of the photo-sensors. Laser beams 101 and 102 produced by the laser diodes 11 and 12 have a diameter of 250 μm with a center distance of about 300 μm in this embodiment. The sensor M1 senses signals on slant C, while the sensor N2 senses signals on slant D. The laser beams originating from the laser diodes 11 and 12 and reflected by the half-mirror 37 are of sufficiently far-field, and enter the photo-sensors G and H without separating from each other. By comparing the amount of incident beams to the sensors G and H, focusing control can be performed (refer to Japanese Patent Laid-open specification No. 56-7246). Components of frequencies $f_1$ and $f_2$ are extracted from signals provided by the photo-sensors G and H, and tracking control is performed as shown in FIG. 5.

The second embodiment allows recording of high quality information such as digital video signals on a real-time basis and also allows erasure of recorded signals. Since the laser spot 3 for the erasing operation has larger sizes in both the groove longitudinal and lateral directions than those of the spots 1 and 2, aberration of the objective lens 14 is not so serious, allowing the laser beam to have an angle of 3-5 degrees with respect to the optical axis of the object lens 14.

The following describes the adjustment for the spatial relationship of the laser spots 1, 2 and 3 on the optical disk surface. In order for the laser spots 1 and 2 to trace the central portions of two adjoining slants, the laser source chip including the laser diodes 11 and 12 is adjustably turned finely around the optical axis of the objective lens 13-1. Furthermore, in order for the laser spot 3 to trace the bottom of the groove midway between the spots 1 and 2, tracking is controlled such that the laser beam of wavelength $\lambda_2$ is equally received by the split photo-sensors $J_1$ and $J_2$ after reflection by the filter 34 in FIG. 8.

EMBODIMENT 3

Figure 13:
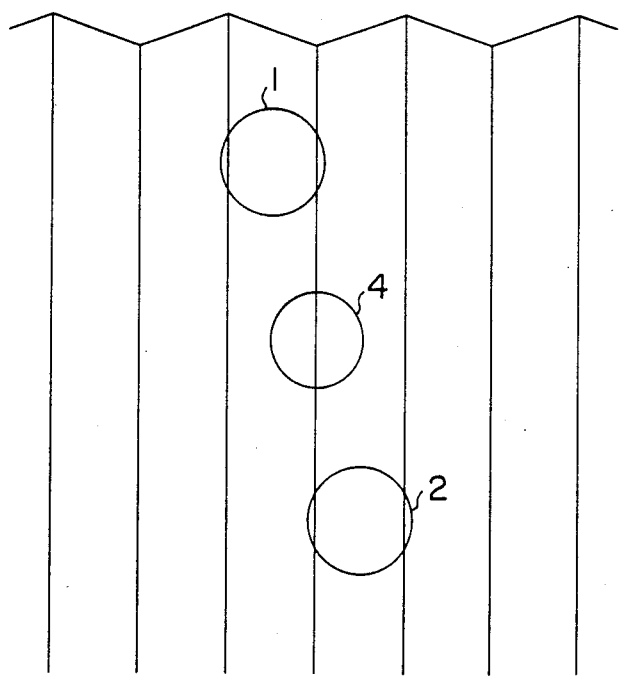
FIG. 13 is a diagram showing laser spots on the optical disk of the third embodiment.

FIG. 12a shows the third embodiment, which uses laser diodes 11 and 12 (providing beams of wavelength $\lambda_1$) which are integrated in one chip and a laser diode 10 (providing a beam of wavelength $\lambda_2$) as in the case of the second embodiment. The wavelengths are selected to be $\lambda_1 = 780$ nm and $\lambda_2 = 840$ nm also in the third embodiment. The laser beams are focused on the optical disk in the same way as in the second embodiment, but all of them form circular spots 1, 2 and 4 as shown in FIG. 13. The spot 4 at the bottom of a V-shaped groove is produced by the laser diode 10, while the spots 1 and 2 are produced by the laser diodes 11 and 12. The laser beams reflected from the optical disk are transmitted through a polarization beam splitter 24 and used for tracking control and information signal reproduction as in the case of the second embodiment. FIGS. 12b and 12c are views of optical elements seen in the directions of X and Y, respectively, of FIG. 12a. A lens 31 condenses the laser beams, and a half-mirror 38 reflects only the beam of wavelength $\lambda_2$ and transmits the beam of wavelength $\lambda_1$. A mirror 39 is placed in the light path where the beam of wavelength $\lambda_2$ is being condensed, and photo-sensors K and L are located on the focal plane so that focusing control is carried out. Split photo-sensors S and T are used to make symmetric far-field patterns of the beam of wavelength $\lambda_2$, so that the laser spot 4 can be centered to track along the bottom of the V-shaped groove. Accordingly, the optical system of this embodiment does not need the variation of the depth of each groove alternately at frequencies $f_1$ and $f_2$ as is the case of FIG. 5. The laser beam of wavelength $\lambda_1$ transmitted through the half-mirror 38 is received by the photo-sensors M and N, and used for information signal reproduction. The profile of the photo-sensors is the same as shown in FIG. 11. Spots 101 and 102 are produced by the laser diodes 11 and 12, respectively. Sensor $M_1$ reproduces signals on slant C, while sensor $N_2$ reproduces signals on slant D. It is possible for an optical disk with grooves of different depths provided at frequencies $f_1$ and $f_2$ to make tracking by extracting components of the frequencies $f_1$ and $f_2$ from signals received by all of the sensors $M_1$, $M_2$, $N_1$ and $N_2$.

Figure 14:
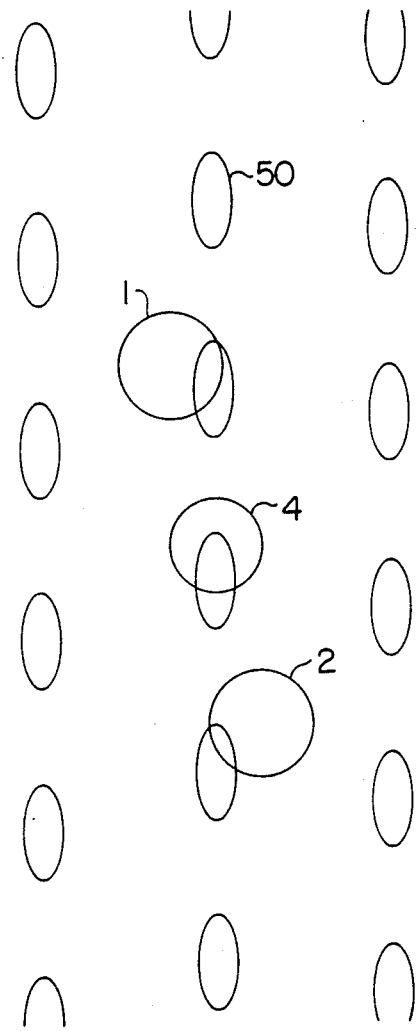
FIG. 14 is a diagram showing laser spots on a conventional optical video disk when reproduction is performed by the optical system of the third embodiment.

The optical system of the third embodiment is applicable for signal reproduction with currently available "Optical Video Disks". FIG. 14 illustrates the surface of such a disk, where video information is recorded as aligning pits 50. It is known that a prior art 3-beam system performs a stable tracking for the pit alignment. Namely, video signals are extracted from the sum of signals from sensors $M_1$ and $N_1$ and the sum of signals from sensors $M_2$ and $N_2$, and tracking control is performed on the basis of a comparison between their envelope signals. The video signal can be reproduced using the sum of signals from the photo-sensors K, L, S and T.

Finally, consider the "reproduction-only digital video disk," in which digital video signals are recorded in advance using two adjoining slants of each V-shaped groove in a pair. Signals are recorded on the slants in the form of optical bits of varying reflectivity or geometrical pits. In any case, each V-shaped groove does not need to have the varying depth as shown in FIG. 5. By application of the foregoing third embodiment, it is possible to realize a digital video disk system which is compatible with the optical video disk currently available in the market.

According to the present invention, as described above, high quality information can be recorded, reproduced or erased on a real-time basis using two adjoining slants of V-shaped grooves as a set of signal recording surfaces.

What we claim is:

1. A method of reproducing or recording an optical disk which is provided with a groove having a V-shaped cross section in the radial direction and defining first and second slants and a groove bottom between the first and second slants, said method comprising the steps of:

providing at least three laser sources creating first, second, and third laser beams independently, the third laser beam having a wavelength that is different from the wavelength of the first laser beam and the wavelength of the second laser beam;

focusing said third laser beam along said bottom of said V-shaped groove;

using said third laser beam, following reflection from said optical disk, for focusing control and tracking control;

conducting said first and second laser beams to an objective lens for focusing said first and second laser beams onto said optical disk substantially parallel to the optical axis of said lens so that said first laser beam is focused on the first slant of said V-shaped groove and said second laser beam is focused on the second slant adjoining said first slant;

preventing said first and second laser beams from returning to said laser sources after reflection from said optical disc; and subjecting said first and second laser beams to information reproduction or recording processes separately.

2. A method according to claim 1, wherein the step of using said third laser beam following reflection from the optical disc comprises conveying a portion of said third laser beam to a first plurality of photo-sensors for tracking control and conveying another portion of said third laser beam to a second plurality of photo-sensors for focusing control, the first plurality of photo-sensors being disposed in a first plane and the second plurality of photo-sensors being disposed in a second plane that is angled with respect to the first plane.

* * * * *